(12) United States Patent
Dalsgaard et al.

(10) Patent No.: US 8,929,347 B2
(45) Date of Patent: Jan. 6, 2015

(54) SCHEDULING AHEAD FOR IMPROVING DATA TRANSMISSION IN CASE OF MEASUREMENT

(75) Inventors: Lars Dalsgaard, Oulu (FI); Frank Frederiksen, Klarup (FI); Troels Emil Kolding, Klarup (FI)

(73) Assignee: Nokia Corporation, Espoo (FI)

( * ) Notice: Subject to any disclaimer, the term of this patent is extended or adjusted under 35 U.S.C. 154(b) by 664 days.

(21) Appl. No.: 12/812,594

(22) PCT Filed: Jan. 9, 2009

(86) PCT No.: PCT/IB2009/050092
§ 371 (c)(1),
(2), (4) Date: Jul. 12, 2010

(87) PCT Pub. No.: WO2009/090583
PCT Pub. Date: Jul. 23, 2009

(65) Prior Publication Data
US 2010/0290420 A1    Nov. 18, 2010

Related U.S. Application Data

(60) Provisional application No. 61/020,477, filed on Jan. 11, 2008.

(51) Int. Cl.
*H04W 72/04* (2009.01)
*H04W 72/12* (2009.01)
*H04W 36/00* (2009.01)
*H04L 5/00* (2006.01)
*H04W 24/10* (2009.01)

(52) U.S. Cl.
CPC ......... *H04W 72/1205* (2013.01); *H04L 5/0044* (2013.01); *H04L 5/006* (2013.01); *H04W 24/10* (2013.01); *H04W 36/0088* (2013.01); *H04W 72/04* (2013.01); *H04W 72/1268* (2013.01)
USPC .......................................... 370/338; 370/328

(58) Field of Classification Search
None
See application file for complete search history.

(56) References Cited

U.S. PATENT DOCUMENTS

| | | | |
|---|---|---|---|
| 7,200,124 B2 * | 4/2007 | Kim et al. | 370/324 |
| 2007/0223416 A1 * | 9/2007 | Baker et al. | 370/328 |
| 2008/0189970 A1 * | 8/2008 | Wang et al. | 33/701 |
| 2008/0192674 A1 * | 8/2008 | Wang et al. | 370/315 |
| 2009/0168731 A1 * | 7/2009 | Zhang et al. | 370/336 |
| 2009/0209256 A1 * | 8/2009 | Nakashima et al. | 455/436 |
| 2012/0147778 A1 * | 6/2012 | Ishii et al. | 370/252 |
| 2012/0236811 A1 * | 9/2012 | Ishii et al. | 370/329 |

FOREIGN PATENT DOCUMENTS

WO    2007/053851 A    5/2007

OTHER PUBLICATIONS

International Search Report and Written Opinion received in corresponding Patent Cooperation Treaty Application No. PCT/IB2009/050092, May 13, 2009, 12 pages.

Qualcomm Europe, "Measurement Gap Scheduling", 3GPP TSG-RAN WG2 #55, R2-062871, Seoul, Korea, Oct. 9-13, 2006, 3 pages.

(Continued)

*Primary Examiner* — Jianye Wu
(74) *Attorney, Agent, or Firm* — Harrington & Smith

(57) ABSTRACT

An approach is provided for scheduling communication resources to minimize the effects of a measurement gap. The timing between a resource allocation grant for a communication link, corresponding data transmission, and associated error control transmissions is delayed to avoid transmitting data to or receiving data from a user equipment during a measurement gap.

20 Claims, 11 Drawing Sheets

(56) References Cited

OTHER PUBLICATIONS

Research in Motion Ltd, "Semi-Persistent Scheduling and DRX Control", 3GPP TSG-RAN-WG2 #58, R2-072777, Orlando, USA, Jun. 25-29, 2007, 5 pages.

NTT DoCoMo, Inc., "Measurement Gap Control", 3GPP TSG RAN WG2 #59, R2-073369, Athens, Greece, Aug. 20-24, 2007, 5 pages.

Ericsson, "Idle Gaps for Handover Measurements in E-UTRAN", 3GPP TSG-RAN WG2 #58bis, R2-072544, Orlando, USA, Jun. 25-29, 2007, 7 pages.

Office Action received in corresponding European Application No. 09702918.5, Jun. 15, 2011, 6 pages.

3GPP TS 36.300 V9.4.0, "$3^{rd}$ Generation Partnership Project; Technical Specification Group Radio Access Network; Evolved Universal Terrestrial Radio Access (E-UTRA) and Evolved Universal terrestrial Radio Access Network (E-UTRAN); Overall description; Stage 2 (Release 9)", Jun. 2010, 171 pgs.

3GPP TR 25.814 V1.5.0, "$3^{rd}$ Generation Partnership Project; Technical Specification Group Radio Access Network; Physical Layer Aspects for Evolved UTRA (Release 7)", May 2006, 125 pgs.

3GPP TR 25.813 V7.1.0, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7), Sep. 2006, 41 pgs.

\* cited by examiner

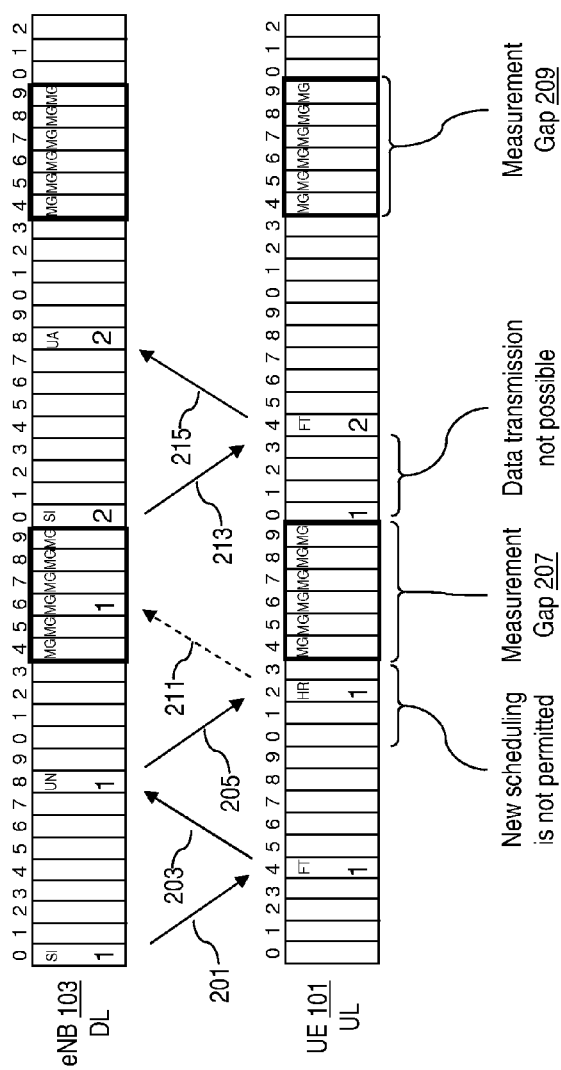

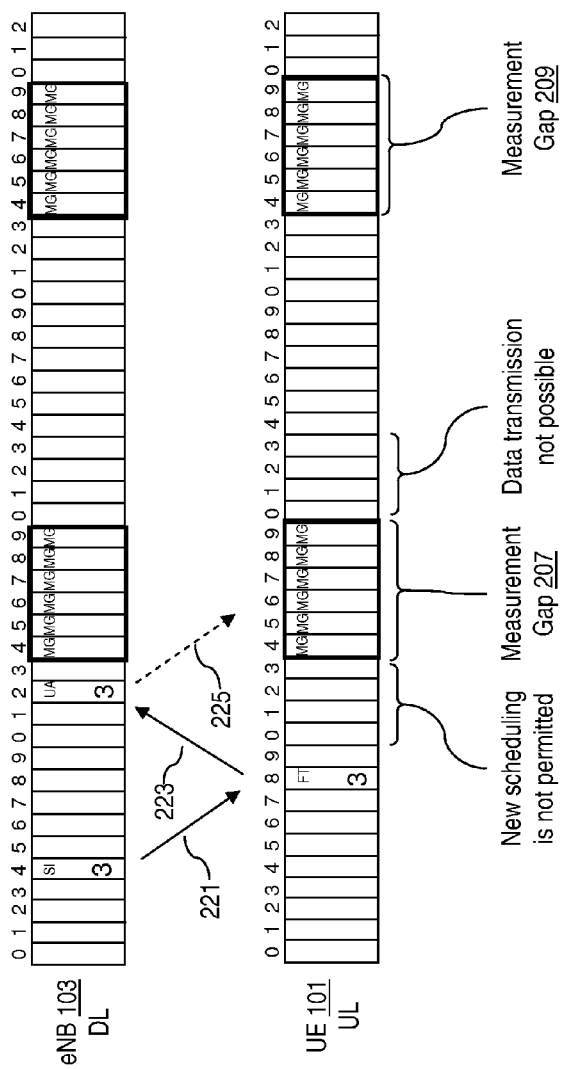

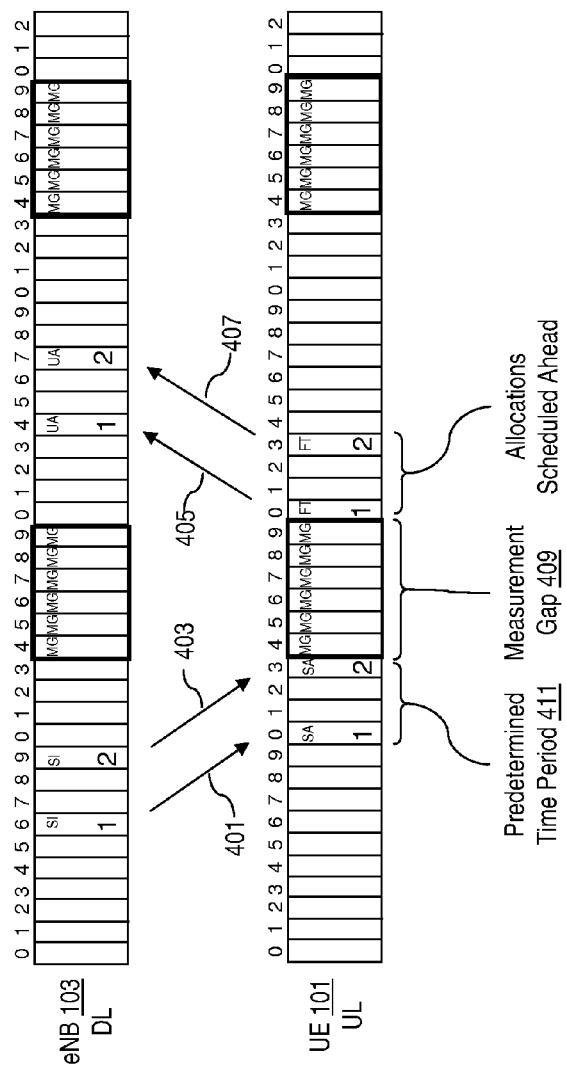

SCHEDULING AHEAD FOR IMPROVING DATA TRANSMISSION IN CASE OF MEASUREMENT

RELATED APPLICATION

This application was originally filed as PCT Application No. PCT/IB2009/050092 on Jan. 9, 2009 and claims priority to U.S. Provisional Application No. 61/020,477 filed on Jan. 11, 2008 which is incorporated herein by reference in its entirety.

BACKGROUND

Radio communication systems, such as wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, Orthogonal Frequency Division Multiplexed (OFDMA) networks, spatially multiplexed networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves scheduling of resources in the communication links. Such scheduling procedure is particularly challenging in view of the many processes that are concurrently performed, namely handover and retransmissions; these processes can disrupt the resource allocation procedure.

Some Exemplary Embodiments

Therefore, there is a need for an approach for providing resource scheduling, which can co-exist with already developed standards and protocols.

According to one embodiment, a method comprises determining an initiation point and duration of a measurement gap that permits a user equipment to perform measurements. The method also comprises allocating a resource of a communication link to the user equipment prior to the initiation point of the measurement gap, wherein the resource allocation is a future allocation beyond the time period of the measurement gap.

According to another embodiment, an apparatus comprises logic configured to determine an initiation point and duration of a measurement gap that permits a user equipment to perform measurements, and to allocate a resource of a communication link to the user equipment prior to the initiation point of the measurement gap, wherein the resource allocation is a future allocation beyond the time period of the measurement gap.

According to another embodiment, an apparatus comprises means for determining an initiation point and duration of a measurement gap that permits a user equipment to perform measurements. The apparatus also comprises means for allocating a resource of a communication link to the user equipment prior to the initiation point of the measurement gap, wherein the resource allocation is a future allocation beyond the time period of the measurement gap.

According to another embodiment, a method comprises receiving a resource allocation from a base station and detecting the resource allocation to be within a predetermined period prior to a measurement gap. The method also comprises determining the resource allocation to be a future allocation beyond the measurement gap.

According to yet another embodiment, an apparatus comprises logic configured to receive a resource allocation from a base station, detect the resource allocation to be within a predetermined period prior to a measurement gap, and determine the resource allocation to be a future allocation beyond the measurement gap.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2A and 2B are diagrams of exemplary uplink allocation operations involving the existence of measurement gaps and a hybrid automatic repeat request (H-ARQ) procedure when transmitting data and when receiving error-control signaling, respectively;

FIG. 4 is a diagram of an uplink resource scheduling ahead operation in connection with measurement gaps, according to an exemplary embodiment;

DESCRIPTION OF PREFERRED EMBODIMENT

An apparatus, method, and software for scheduling to minimize the effects of a measurement gap are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with the Third Generation Partnership Project (3GPP) Long Term Evolution (LTE) or EUTRAN (Enhanced UMTS (Universal Mobile Telecommunications System) Terrestrial Radio Access Network)) architecture, it is recognized by one of ordinary skill in the art that the embodiments of the inventions have applicability to any type of communication system (e.g., WiMAX (Worldwide Interoperability for Microwave Access)) and equivalent functional capabilities. Additionally, while the scheduling ahead approach is explained in the context of the uplink, it is contemplated that the approach has applicability to the downlink as well.

Figure 1:
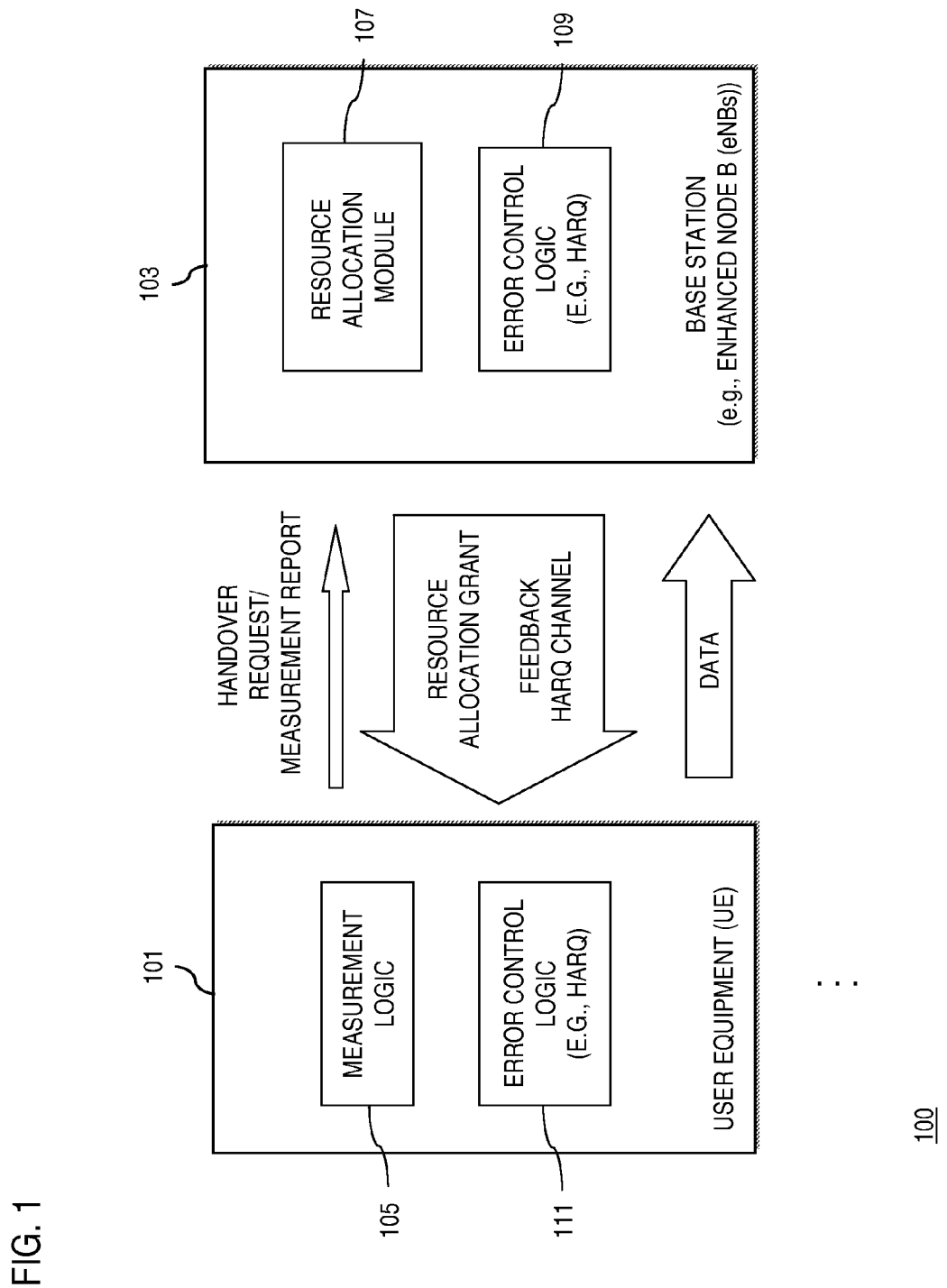
FIG. 1 is a diagram of a communication system capable of scheduling to minimize the effects of a measurement gap, according to an exemplary embodiment.

FIG. 1 is a diagram of a communication system capable of scheduling to minimize the effects of a measurement gap, according to an exemplary embodiment. The system 100 of FIG. 1 is described with respect to an exemplary uplink allocation operation involving the existence of measurement gaps and a hybrid automatic repeat request (H-ARQ) procedure as depicted in FIGS. 2A and 2B. Such uplink allocation operation may, for example, be implemented using the components of system 100. As shown in FIG. 1, a communication system 100 (e.g., wireless network) includes one or more user equipment (UEs) 101 that communicate with a base station 103, which is part of an access network (e.g., 3GPP LTE or E-UTRAN, etc.) (not shown).

For example, under the 3GPP LTE architecture (as shown in FIGS. 5A-5D), the base station 103 is denoted as an enhanced Node B (eNB). The UE 101 can be any type of mobile stations, such as handsets, terminals, stations, units, devices, multimedia tablets, Internet nodes, communicators, Personal Digital Assistants (PDAs) or any type of interface to the user (such as "wearable" circuitry, etc.). The UE 101 may be a fixed terminal, a mobile terminal, or a portable terminal. The system, according to one embodiment, operates using the Frequency Division Duplex (FDD) mode of 3GPP, as well as a Time Domain Duplexing (TDD) mode.

In the TDD mode of operation, it is recognized that for TDD configurations (where there are more uplink resources than downlink resources), generally more uplink allocations are performed for a user within a single downlink slot (Physical Downlink Control Channel (PDCCH)). This control channel is used to convey scheduling information to the UEs 101.

According to certain embodiments, the system 100 enables the scheduling of a resource allocation for a communication link just prior to a measurement gap for a point in time ahead of the measurement gap. It is noted that measurement gaps occur at times that are coordinated between the eNB 103 and UE 101 (through, for example, measurement logic 105 of UE 101). The purpose of the measurement gaps can be, as example, to enable the UE 101 to perform measurements needed in order to create a measurement report based on network signaling conditions. The measurement report can be in response to, for instance, a measurement command to enable a handover process. During a measurement gap, the UE 101 typically cannot receive or transmit, thereby introducing potential "holes" into communication resources. The inability of the UE 101 to receive or transmit creates two problems: (1) the eNB 103 cannot use traditional dynamic scheduling to allocate uplink resources for a certain time period following the measurement gap (e.g., the first four Transmission Time Intervals (TTIs) after the gap), and (2) the UE 101 cannot obtain an error control (e.g., H-ARQ) acknowledgement signal for uplink transmissions or transmit an error control acknowledgement signal for downlink transmissions occurring a certain time period before the measurement gap (e.g., the last four TTIs before a measurement gap).

By scheduling resource allocations ahead of a measurement gap and correspondingly altering the timing of error control signaling, the system 100 addresses the problems discussed above and minimizes the effects of the measurement gap on transmissions between the UE 101 and base station 103. For instance, a resource allocation scheduled for a time just prior to a measurement gap will be presumed to be an allocation that points to a time corresponding to the original allocation delayed by the time duration of the measurement gap. Error control signaling is similarly delayed beyond the duration of the measurement gap. In this way, the measurement gap is "logically" removed from the timing relationships of the transmissions between the eNB 103 and UE 101.

In exemplary embodiments, the eNB 103 employs a transceiver (not shown) to exchange information with the UE 101 via one or more antennas, which transmit and receive electromagnetic signals. For instance, the eNB 103 may utilize a Multiple Input Multiple Output (MIMO) antenna system for supporting the parallel transmission of independent data streams to achieve high data rates with the UE 101. The eNB 103 may use orthogonal frequency divisional multiplexing (OFDM) as a downlink (DL) transmission scheme and a single-carrier transmission (e.g., single carrier-frequency division multiple access (SC-FDMA)) with cyclic prefix for the uplink (UL) transmission scheme. SC-FDMA can also be realized using a DFT-S-OFDM principle, which is detailed in 3GGP TR 25.814, entitle "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

In exemplary embodiments, the system 100 uses concatenation of Forward Error Correction (FEC) coding and an Automatic Repeat request (ARQ) protocol commonly known as Hybrid ARQ (H-ARQ). Automatic Repeat Request (ARQ) is an error detection mechanism used on the link layer. This mechanism permits the receiver to indicate to the transmitter that a packet or sub-packet has been received incorrectly, and thus, requests the transmitter to resend the particular packet(s); it is noted the UE 101 and eNB 103 can act as either receiver or transmitter. This can be accomplished with a Stop and Wait (SAW) procedure, in which the transmitter waits for a response from the receiver before sending or resending packets. That is, Hybrid ARQ (H-ARQ) provides a link adaptation mechanism, and is a combination of ARQ and Forward Error Correction (FEC) techniques. The erroneous packets are used in conjunction with retransmitted packets. Two conventional techniques include, for example, a synchronous H-ARQ mechanism, and an Asynchronous Adaptive Incremental Redundancy (AAIR).

By way of example, in LTE, the eNB 103 controls allocation of the uplink resources (e.g., using a resource allocation module 107); that is, all control of the uplink resources are granted and revoked by the eNB 103. Under the LTE architecture, fast hybrid automatic repeat request (H-ARQ) can be used to increase spectral efficiency. The normal H-ARQ operation for dynamic scheduled uplink data is that for each uplink resource grant (signaled on a downlink control channel (e.g., PDCCH)) there is an associated H-ARQ feedback channel for positive and negative acknowledgements (ACK/NACK). It is recognized that there is a delay between the time of the uplink grant (on the PDCCH) to the time when the UE 101 actually transmits uplink data, and a further delay to the time when the eNB 103 should send the ACK/NACK on the PHICH (Physical H-ARQ indication channel). According to one embodiment, the order of the uplink grant presents a mapping for the UE 101 so that the UE 101 will know where on the PHICH the associated ACK/NACK report will be sent. Alternatively, the eNB 103 can use an adaptive H-ARQ process whereby the ACK/NACK report can be signaled on the PDCCH. Both the eNB 103 and UE 101 are configured to execute this H-ARQ scheme via error control logic 109 and 111, respectively.

Under one assumption, the scheduling delay between a resource allocation and the associated data transmission can be, for instance, 3 ms (plus the delay of the actual signalling on the PDCCH), and that the eNB 103 processing time is also 3 ms. As such, the timing relation for a single H-ARQ process or channel can be shown in Table 1 (FDD mode):

TABLE 1

| Transmission Time Interval (TTI) | Event |
| --- | --- |
| TTI#0 | (Uplink) UL allocation grant on the PDCCH |
| TTI#4 | UL data transmission |
| TTI#8 | UL ACK/NACK (received in DL) on the PHICH or a dynamic scheduling for UL retransmission (on the PDCCH) for non-adaptive H-ARQ |

FIGS. 2A and 2B are diagrams of exemplary uplink allocation operations involving the existence of measurement gaps and a hybrid automatic repeat request (H-ARQ) procedure when transmitting data and when receiving error-control signaling, respectively. FIG. 2A depicts the example of scheduling a data transmission immediately before a measurement gap. As shown, the eNB 103 signals a resource allocation grant 201 to UE 101, for example, at TTI#0 via a downlink channel (e.g., the PDCCH). In the example, there is a total delay of 4 ms from the transmission of the resource allocation grant 201 and the transmission of the uplink data 203 (transmission of the resource allocation grant 201 accounts for 1 ms, and UE 101 reception and processing accounts for another 3 ms). It is noted that the system delay of 4 ms used in the examples of FIGS. 2A and 2B is exemplary and that other applicable examples may have other delay values or no delay at all. By TTI#4, the UE 101 has received the resource allocation grant 201 and initiates an uplink data transmission 203 using the allocated uplink resources. The uplink data transmission 203 may also include an ACK/NACK associated with downlink signalling from eNB 103. Following the transmission 203 (which also takes 1 ms), there is a further delay of 3 ms (for eNB 103 reception and processing) until an ACK/NACK or dynamic uplink allocation can take place. Accordingly, at TTI#8, the eNB 103 transmits its ACK/NACK message 205 to UE 101. In this example, the message is a NACK indicating a need for a non-adaptive H-ARQ retransmission of the data transmission 203.

It is further assumed that the uplink H-ARQ retransmission operation is synchronous. That is, the H-ARQ retransmission delay is fixed. In case that non-adaptive H-ARQ is used for the uplink (i.e., uplink retransmissions are performed on the same physical resources), the eNB 103 provides an indication of whether retransmission is to be performed over the uplink. In an exemplary embodiment, this can be handled through PHICH signalling, whereby the UE 101 is assigned a PHICH resource through its "allocation order," which for instance could be related to a Control Channel Element (CCE) index used for the indication of the resource allocation (TTI #0 in the above sequence). An alternative method for assigning the PHICH resource is through a mapping relative to the allocated UL resource for the considered UE 101.

Additionally, FIG. 2A depicts measurement gaps 207 and 209 that can affect the timing relationships of uplink and downlink transmissions as well as the accompanying error control transmissions between eNB 103 and UE 101. It is noted that the measurement gaps 207 and 209 can influence or even break the H-ARQ timing relationships, because of the potential delay from when the UE 101 receives an uplink grant to the time the UE 101 transmits the data and receives an ACK/NACK. For example, measurement gap 207 occurs at TTI#14 and lasts for 6 ms. For a period of time before the measurement gap 207 (e.g., 4 ms—representing 1 ms for transmission time and another 3 ms reception and processing), scheduling of uplink transmissions (including transmissions related to error control (e.g., H-ARQ)) is not practical because the UE 101 typically is not able to transmit or receive during the measurement gap 207. Therefore, eNB 103 cannot grant a resource allocation for data transmission 211 because this transmission will occur during measurement gap 207. Correspondingly, the UE 101 also cannot start transmitting data until after 4 TTIs have elapsed following the measurement gap 207 because the UE 101 cannot receive uplink grants during the measurement gap 207 either. For instance, the earliest that eNB 103 can allocate resources for a data transmission following measurement gap 207 is at TTI#20. The UE 101 would then receive uplink transmission grant 213 and initiate a data transmission 215 at TTI#24.

FIG. 2B depicts a related example in which the UE 101 is unable to receive an ACK/NACK during measurement gap 207. In this example, the eNB 103 grants a resource allocation 221 to the UE 101 at TTI#4. The UE 101 receives the allocation and makes the corresponding transmission 223 at TTI #8, which the eNB 103 acknowledges by transmitting a positive ACK 225 at TTI#12. The UE 101, however, is unable to receive ACK 225 because it will reach the UE 101 during the period of measurement gap 207 at TTI#16. Accordingly, the UE 101 will not receive the ACK 225 and the UE 101 will not know that transmission 223 was successfully received at the eNB 103.

The resource scheduling approach of system 100 stems from the recognition of the above problems and drawbacks associated with traditional scheduling involving measurement gaps.

Figure 3:
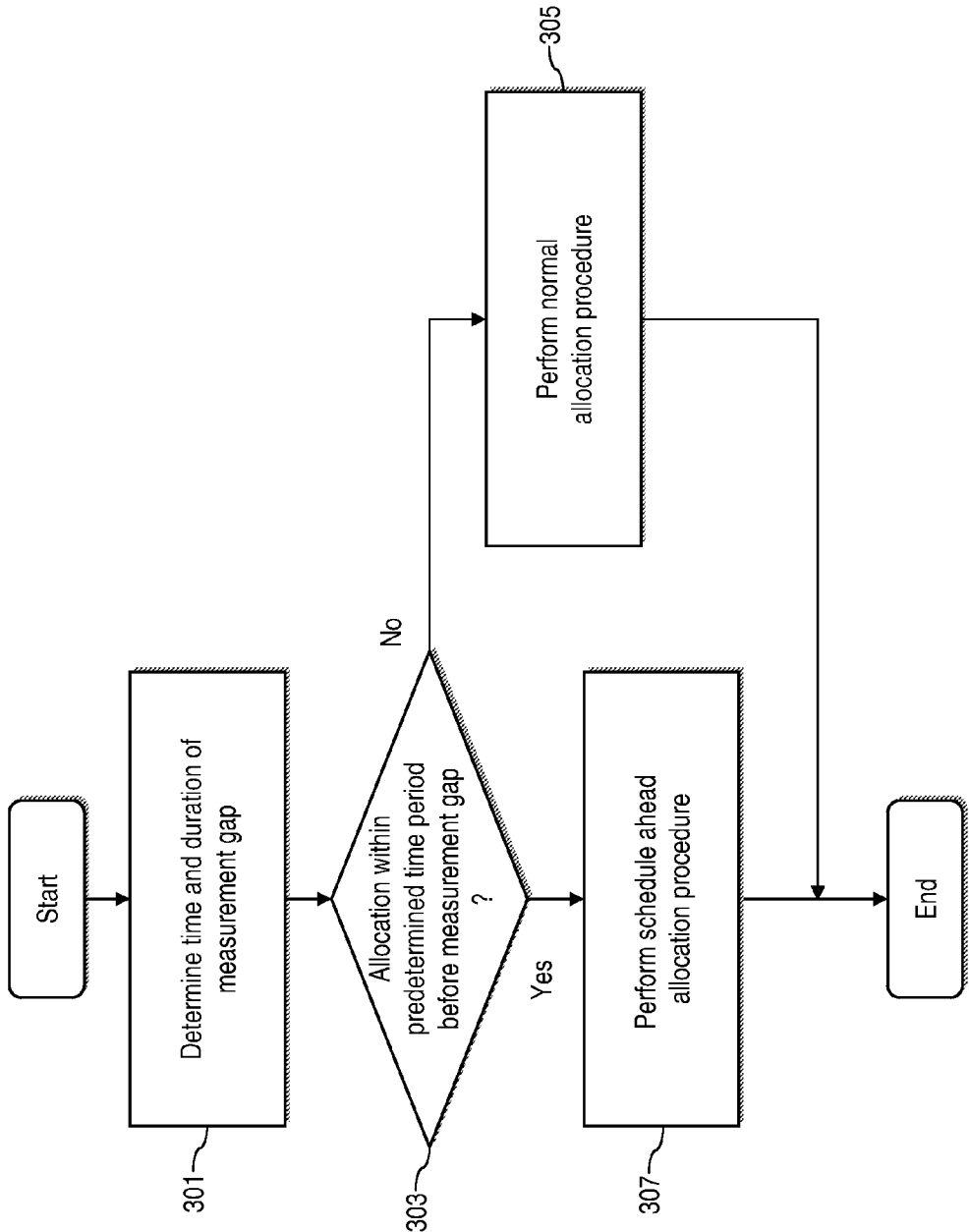
FIG. 3 is a flowchart of a process for scheduling to minimize the effects of a measurement gap, according to an exemplary embodiment.

FIG. 3 is a flowchart of a process for scheduling to minimize the effects of a measurement gap, according to an exemplary embodiment. In step 301, the eNB 103 determines the time and duration of one or more measurement gaps to assist in coordinating and allocating resources of a communications link (e.g., an uplink) to the UE 101. In exemplary embodiments employing, for example, LTE or E-UTRAN architecture, a measurement gap occurs at time instants that are coordinated between the eNB 103 and the UE 101. As mentioned, a measurement gap, for instance, can occur to enable the UE 101 to, for example, support mobility procedures such as a handover. The handover process, according to an exemplary embodiment, requires the UE 101 to provide measurement reports to the eNB 103. However, given the timing relationships described above, it is a challenge to provide a mechanism for allowing the UE 101 to take such measurements in preparation for the handover while maintaining the continuity of data transmissions and associated error control scheme.

After determining when a measurement gap will occur, the eNB 103 determines whether a planned scheduling of the resource allocation (i.e., the grant) is within a predetermined time period before the measurement gap (step 303) such that the actual resource allocation would fall within the measurement gap. The predetermined time period is configurable depending on the timing and processing delays of transmissions between the eNB 103 and UE 101 as described previously with respect to Table 1 and FIGS. 2A and 2B. If the allocation scheduling is outside of this predetermined time period, the eNB 103 treats the allocation as a normal resource allocation procedure and performs no special scheduling to account for measurement gaps (step 305). Otherwise, the eNB 103 performs a schedule-ahead allocation procedure (step 307).

The schedule-ahead approach, according to certain embodiments, enables uplink allocations to be made just prior to a measurement gap point ahead into the future, such that the impact of the measurement gap is minimized. This "just prior" period can be determined based on the observed timing relationships between the eNB 103 and UE 101. In an exemplary embodiment, whenever the UE 101 receives and decodes an uplink resource allocation within, for example, the 4 TTIs just prior to the measurement gap, the UE 101 operates under the presumption that the allocation is pointing to a position in time corresponding to the original allocation delayed by the time duration of the measurement gap and the predetermined time period. In this manner, the per-UE penalty of the measurement gap (e.g., the 4 TTI period after a measurement gap before the UE 101 can resume transmitting) is minimized for the uplink allocations.

As discussed previously, the resource grant may be signalled, for example, implicitly on a physical H-ARQ indication channel (PHICH) or explicitly on a physical downlink control channel (e.g., a PDCCH). In addition, the resource grant may be signalled using a configurable network rule on any available control channel. For instance, the eNB 103 can be configured to operate under a rule to automatically repeat a resource allocation to the UE 101 during a measurement gap. The resource allocation signalling may be performed on any control channel designated by the rule (e.g., a PDCCH). In certain embodiments employing LTE, the eNB 103 maintains tight control of the transmission resources. That is, the eNB 103 will, in a controlled manner, grant resources for both uplink and downlink transmissions. Typically, these grants are given on (1) a time-by-time basis (one grant per transmission), or (2) as semi-persistent allocations/grants, where the resources are given for a longer time period. Without a specific allocation of resources from the eNB 103, the UE 101 will not be able to transmit data on the uplink.

It is noted that the timing relationship among the resource allocation, corresponding data transmission, and associated error-control scheme can be lost when using a schedule-ahead approach or when the UE 101 cannot receive an ACK/NACK in the DL during a measurement gap. For example, because the H-ARQ error-control procedure is expected to operate in a synchronous manner and the UEs will typically perform measurement gaps in a non-synchronized manner (at least not between UEs), special actions need to be taken into account when allocating the H-ARQ resources. One option is to define the operation such that the PHICH resources are lost when scheduling ahead or when the UE 101 will receive an ACK/NACK during a measurement gap (i.e., ACK/NACK is transmitted using PDCCH and, by rule, the UE 101 monitors the PDCCH for potential ACK/NACK information), or that it is necessary to keep the PHICH allocations that refer to the associated resources—i.e., 'block' the CCEs that are referring the PHICH resource for the non-ahead transmissions.

FIG. 4 is a diagram of an uplink resource scheduling ahead operation in connection with measurement gaps, according to an exemplary embodiment. The structure of FIG. 4 redefines the timing relationship between the uplink grants 401 and 403 and the corresponding uplink transmissions 405 and 407 in response to a measurement gap 409. Specifically, the schedule-ahead procedure delays the time between the uplink grant and uplink transmission to avoid the measurement gap 409. At a logical level, the measurement gap 409 is effectively removed by the schedule-ahead allocation procedure by introducing this delay.

In this example, the predetermined time period 411 for invoking schedule-ahead resource allocation is four TTIs prior to the measurement gap 409. The eNB 103 signals a first uplink grant 401 and a second uplink grant 403. The UE 101 receives and processes the grants 401 and 403 within the predetermined time period 411. Accordingly, the UE 101 determines that grants 401 and 403 are future resource allocations (i.e., scheduled ahead allocations) that should be offset by the duration of the measurement gap 409 (6 TTIs) and the predetermined time period 411 (4 TTIs). For instance, grant 401 is received and processed by the UE 101 at TTI#10. The UE 101 designates this grant 401 as a scheduled ahead (SA) grant and offsets the associated uplink transmission by at total of 10 TTIs to account for the measurement gap 409 and predetermined time period 411. The corresponding uplink data transmission 405 occurs at TTI#20 following the measurement gap 409. Similarly, the second grant 403 is received and processed by the UE 101 at TTI#13 for transmission at TTI#23 following the measurement gap 409.

As discussed previously, the scheduling ahead approach depicted in FIG. 4 logically removes the measurement gap from the resource scheduling process. In addition, the approach enables the use of the TTIs surrounding the measurement gap for resource scheduling, data transmission, and/or error signaling that would otherwise remain unused in a traditional resource scheduling approach. Moreover, although the example of FIG. 4 assumes a predetermined time period 411 of four TTIs, other embodiments may have different predetermined time periods for invoking schedule-ahead resource allocations. The specific time period is dependent on the signaling environment (e.g., different transmission and processing times) of the particular communication system. It is also noted that other embodiments may use approaches other than the scheduling ahead approach to minimize the effects of a measurement gap. For example, certain embodiments may configure the eNB 103 to automatically repeat resource allocations to the UE 101 during a measurement gap. In yet other embodiments, the UE 101 can shift its understanding of time to "virtually" eliminate the measurement gap (i.e., the UE 101 and eNB 103 would act as if the time used during a measurement gap does not exist).

By way of example, the communication system of FIG. 1 utilizes an architecture compliant with the UMTS terrestrial radio access network (UTRAN) or Evolved UTRAN (E-UTRAN) in 3GPP, as next described.

FIGS. 5A-5D are diagrams of communication systems having exemplary LTE architectures, in which the system 100 of FIG. 1 can operate, according to various exemplary embodiments of the invention. By way of example (as discussed with respect to FIG. 2), the base stations 103 and the UEs 101 can communicate in system 500 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (SC-FDMA) or a combination thereof. In an exemplary embodiment, both uplink and downlink can utilize WCDMA. In another exemplary embodiment, uplink utilizes SC-FDMA, while downlink utilizes OFDMA.

Figure 5A:
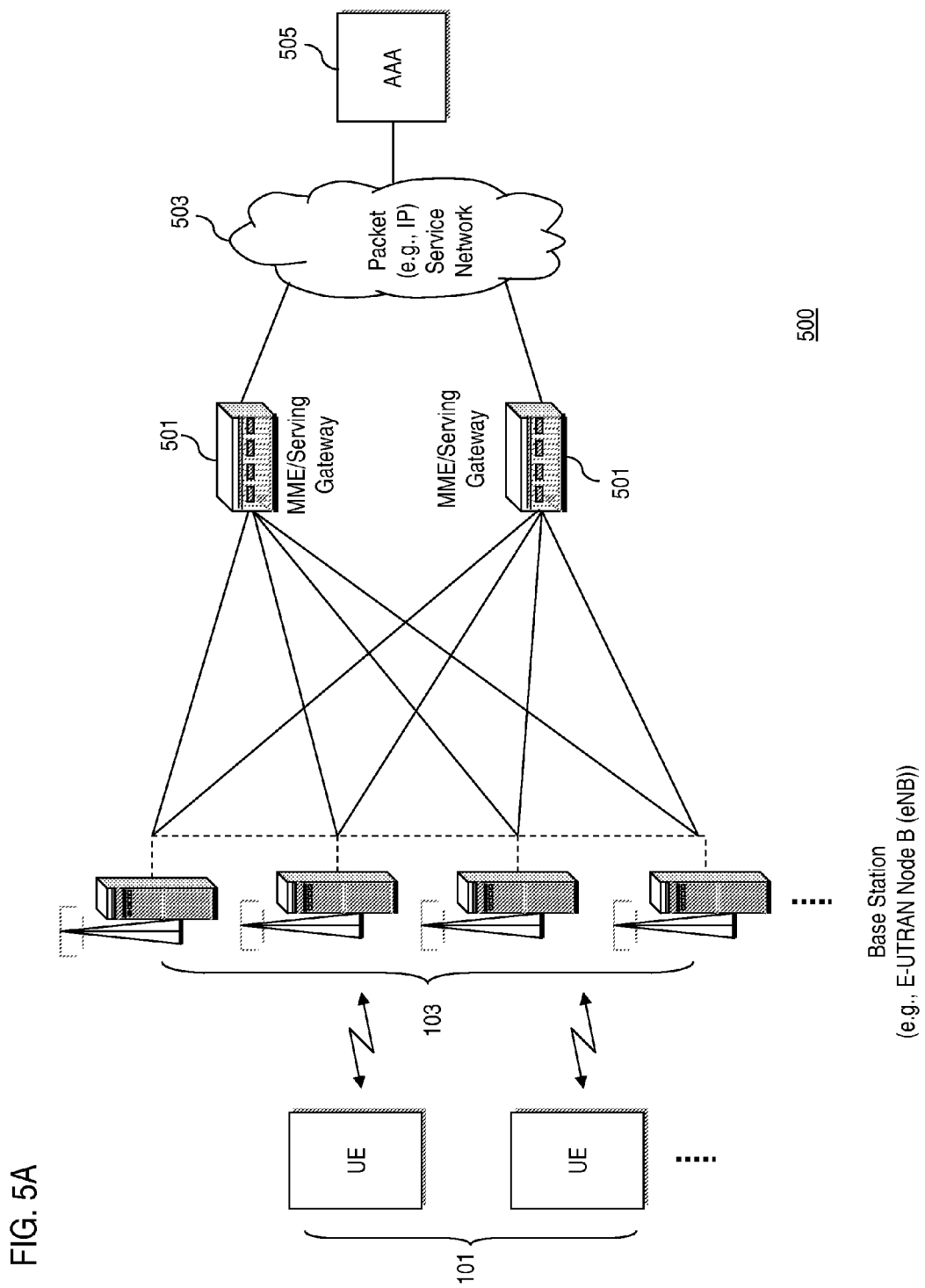
FIGS. 5A-5D are diagrams of communication systems having exemplary long-term evolution (LTE) architectures, in which the system of FIG. 1 can operate, according to various exemplary embodiments of the invention.

The communication system 500 is compliant with 3GPP LTE, entitled "Long Term Evolution of the 3GPP Radio Technology" (which is incorporated herein by reference in its entirety). As shown in FIG. 5A, one or more user equipment (UEs) 101 communicate with a network equipment, such as a base station 103, which is part of an access network (e.g., WiMAX (Worldwide Interoperability for Microwave Access), 3GPP LTE (or E-UTRAN), etc.). Under the 3GPP LTE architecture, base station 103 is denoted as an enhanced Node B (eNB).

The MME (Mobile Management Entity)/Serving Gateways 501 are connected to the eNBs 103 in a full or partial mesh configuration using tunneling over a packet transport network (e.g., Internet Protocol (IP) network) 503. Exemplary functions of the MME/Serving GW 501 include distribution of paging messages to the eNBs 103, IP header compression, termination of U-plane packets for paging reasons, and switching of U-plane for support of UE mobility. Since the GWs 501 serve as a gateway to external networks, e.g., the Internet or private networks 503, the GWs 501 include an Access, Authorization and Accounting system (AAA) 505 to securely determine the identity and privileges of a user and to track each user's activities. Namely, the MME Serving Gateway 501 is the key control-node for the LTE access-network and is responsible for idle mode UE tracking and paging procedure including retransmissions. Also, the MME 501 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 5B:
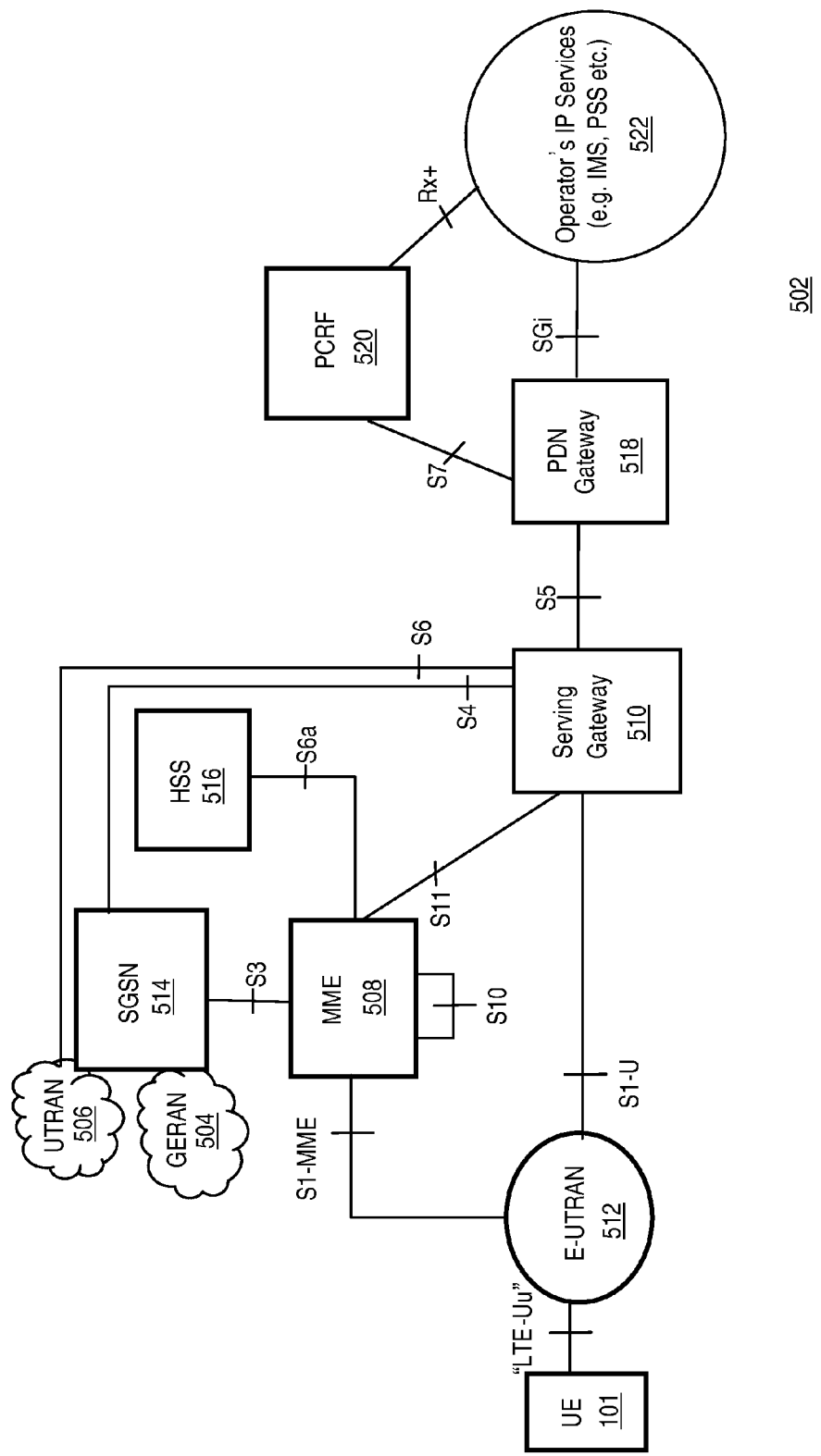

In FIG. 5B, a communication system 502 supports GERAN (GSM/EDGE radio access) 504, and UTRAN 506 based access networks, E-UTRAN 512 and non-3GPP (not shown) based access networks, and is more fully described in TR 23.882, which is incorporated herein by reference in its entirety. A key feature of this system is the separation of the network entity that performs control-plane functionality (MME 508) from the network entity that performs bearer-plane functionality (Serving Gateway 510) with a well defined open interface between them S11. Since E-UTRAN 512 provides higher bandwidths to enable new services as well as to improve existing ones, separation of MME 508 from Serving Gateway 510 implies that Serving Gateway 510 can be based on a platform optimized for signaling transactions. This scheme enables selection of more cost-effective platforms for, as well as independent scaling of, each of these two elements. Service providers can also select optimized topological locations of Serving Gateways 510 within the network independent of the locations of MMEs 508 in order to reduce optimized bandwidth latencies and avoid concentrated points of failure.

As seen in FIG. 5B, the E-UTRAN (e.g., eNB) 512 interfaces with UE via LTE-Uu. The E-UTRAN 512 supports LTE air interface and includes functions for radio resource control (RRC) functionality corresponding to the control plane MME 508. The E-UTRAN 512 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 508, as a key control node, is responsible for managing mobility UE identifies and security parameters and paging procedure including retransmissions. The MME 508 is involved in the bearer activation/deactivation process and is also responsible for choosing Serving Gateway 510 for the UE 101. MME 508 functions include Non Access Stratum (NAS) signaling and related security. MME 508 checks the authorization of the UE 101 to camp on the service provider's Public Land Mobile Network (PLMN) and enforces UE 101 roaming restrictions. The MME 508 also provides the control plane function for mobility between LTE and 2G/3G access networks with the S3 interface terminating at the MME 508 from the SGSN (Serving GPRS Support Node) 514.

The SGSN 514 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 508 and HSS (Home Subscriber Server) 516. The S10 interface between MMEs 508 provides MME relocation and MME 508 to MME 508 information transfer. The Serving Gateway 510 is the node that terminates the interface towards the E-UTRAN 512 via S1-U.

The S1-U interface provides a per bearer user plane tunneling between the E-UTRAN 512 and Serving Gateway 510. It contains support for path switching during handover between eNBs 512. The S4 interface provides the user plane with related control and mobility support between SGSN 514 and the 3GPP Anchor function of Serving Gateway 510.

The S12 is an interface between UTRAN 406 and Serving Gateway 510. Packet Data Network (PDN) Gateway 518 provides connectivity to the UE to external packet data networks by being the point of exit and entry of traffic for the UE. The PDN Gateway 518 performs policy enforcement, packet filtering for each user, charging support, lawful interception and packet screening. Another role of the PDN Gateway 518 is to act as the anchor for mobility between 3GPP and non-3GPP technologies such as WiMAX and 3GPP2 (CDMA 1X and EvDO (Evolution Data Only)).

The S7 interface provides transfer of QoS policy and charging rules from PCRF (Policy and Charging Role Function) 520 to Policy and Charging Enforcement Function (PCEF) in the PDN Gateway 518. The SGi interface is the interface between the PDN Gateway and the operator's IP services including packet data network 522. Packet data network 522 may be an operator external public or private packet data network or an intra operator packet data network, e.g., for provision of IMS (IP Multimedia Subsystem) services. Rx+ is the interface between the PCRF and the packet data network 522.

Figure 5C:
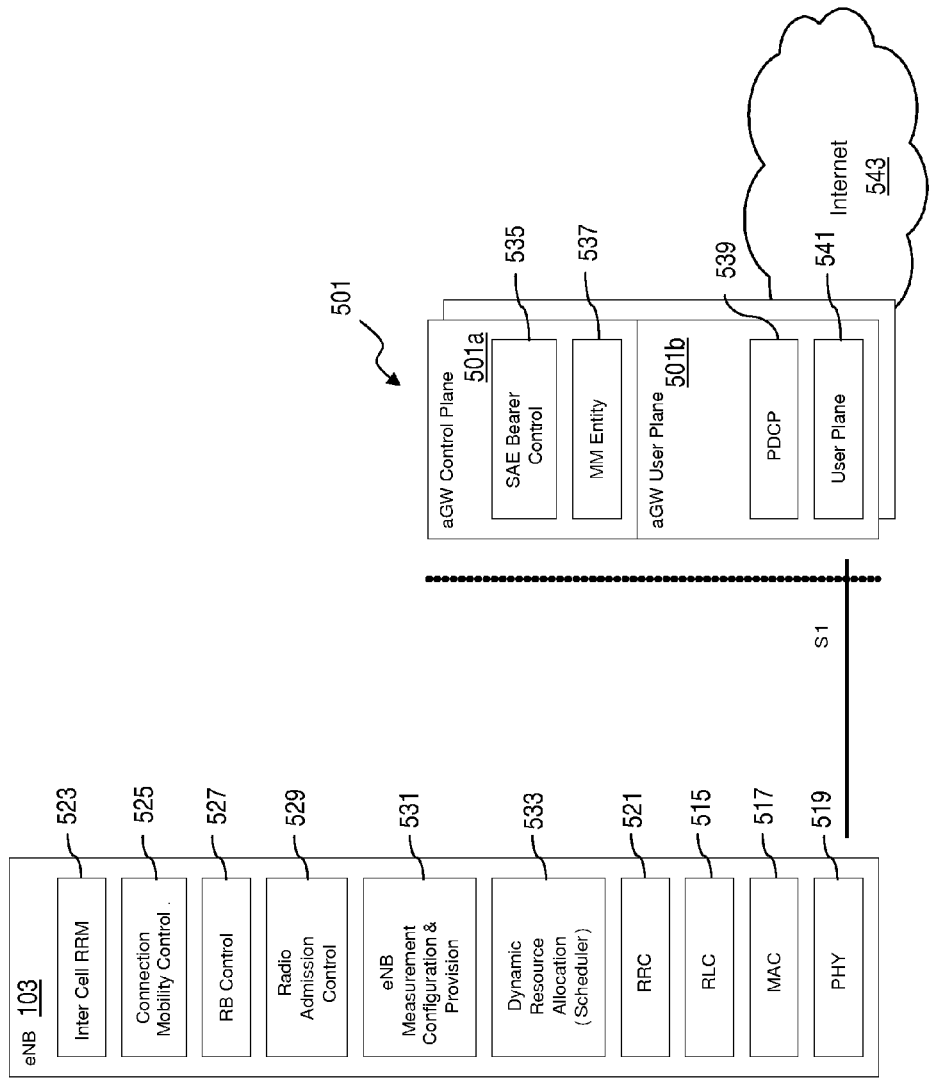

As seen in FIG. 5C, the eNB utilizes an E-UTRA (Evolved Universal Terrestrial Radio Access) (user plane, e.g., RLC (Radio Link Control) 515, MAC (Media Access Control) 517, and PHY (Physical) 519, as well as a control plane (e.g., RRC 521)). The eNB also includes the following functions: Inter Cell RRM (Radio Resource Management) 523, Connection Mobility Control 525, RB (Radio Bearer) Control 527, Radio Admission Control 529, eNB Measurement Configuration and Provision 531, and Dynamic Resource Allocation (Scheduler) 533.

The eNB communicates with the aGW 501 (Access Gateway) via an S1 interface. The aGW 501 includes a User Plane 501*a* and a Control plane 501*b*. The control plane 501*b* provides the following components: SAE (System Architecture Evolution) Bearer Control 535 and MM (Mobile Management) Entity 537. The user plane 501*b* includes a PDCP (Packet Data Convergence Protocol) 539 and a user plane functions 541. It is noted that the functionality of the aGW 501 can also be provided by a combination of a serving gateway (SGW) and a packet data network (PDN) GW. The aGW 501 can also interface with a packet network, such as the Internet 543.

Figure 5D:
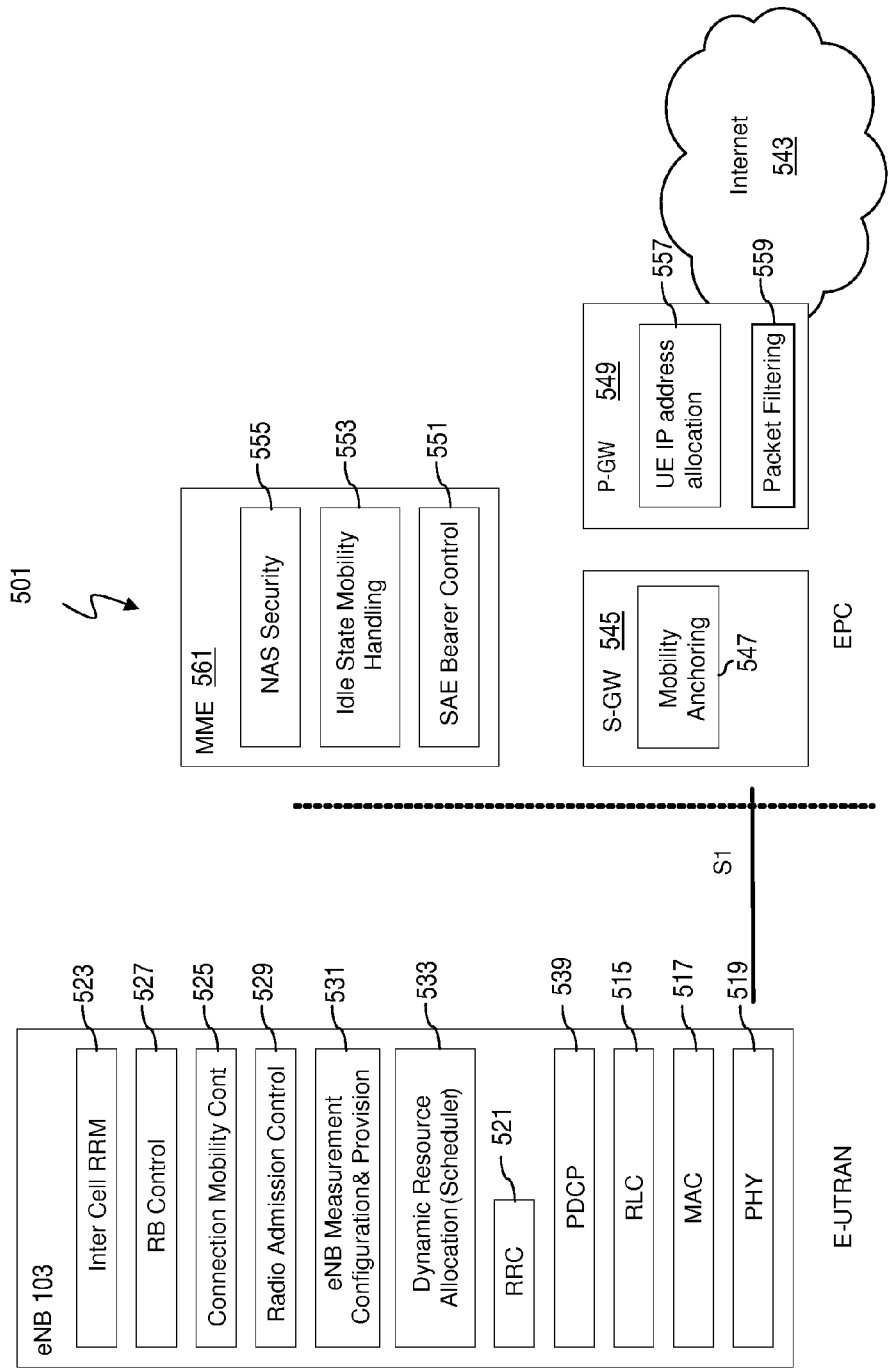

In an alternative embodiment, as shown in FIG. 5D, the PDCP (Packet Data Convergence Protocol) functionality can reside in the eNB rather than the GW 501. Other than this PDCP capability, the eNB functions of FIG. 5C are also provided in this architecture.

In the system of FIG. 5D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 36.300.

The eNB 103 interfaces via the S 1 to the Serving Gateway 545, which includes a Mobility Anchoring function 547. According to this architecture, the MME (Mobility Management Entity) 549 provides SAE (System Architecture Evolution) Bearer Control 551, Idle State Mobility Handling 553, and NAS (Non-Access Stratum) Security 555.

One of ordinary skill in the art would recognize that the processes for signaling scheduling may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 6:
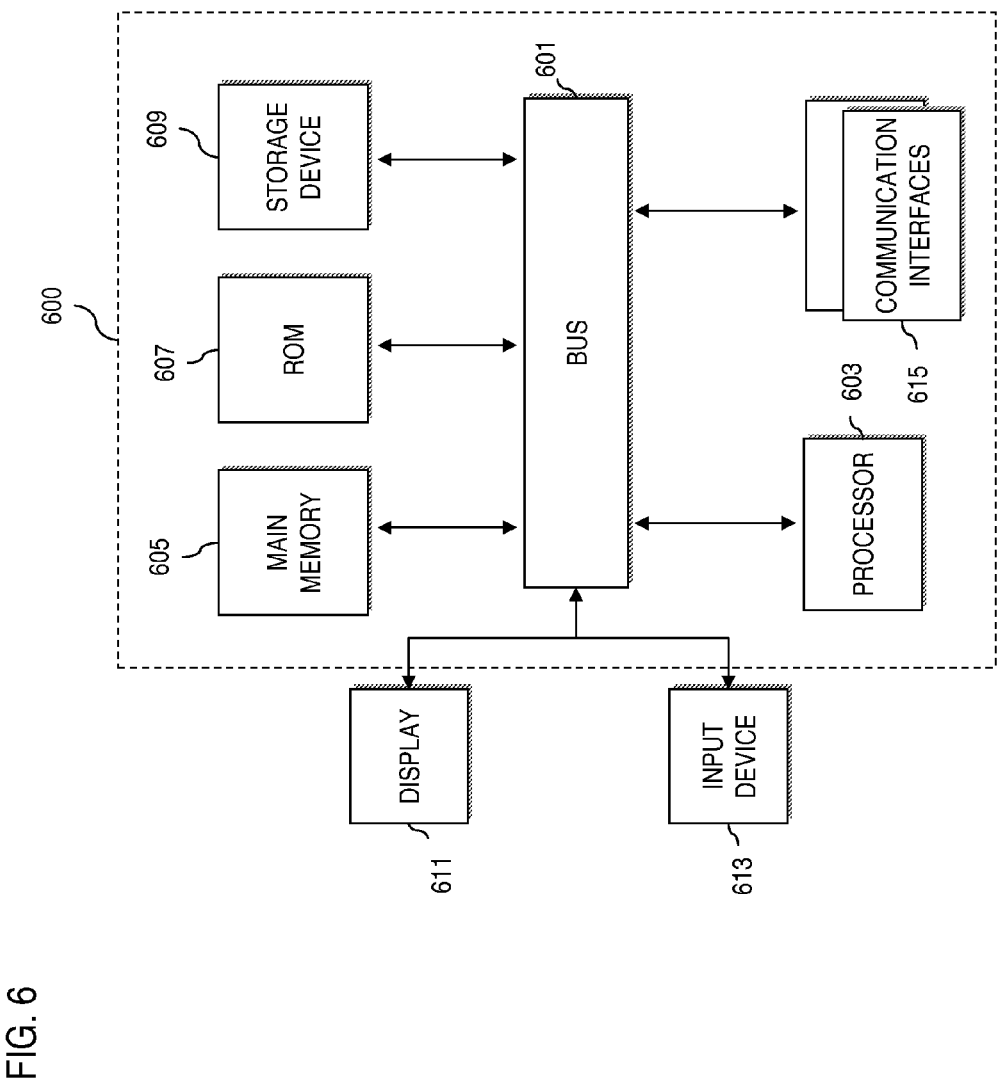
FIG. 6 is a diagram of hardware that can be used to implement an embodiment of the invention.

FIG. 6 illustrates exemplary hardware upon which various embodiments of the invention can be implemented. A computing system 600 includes a bus 601 or other communication mechanism for communicating information and a processor 603 coupled to the bus 601 for processing information. The computing system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computing system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computing system 600 may be coupled via the bus 601 to a display 611, such as a liquid crystal display, or active matrix display, for displaying information to a user. An input device 613, such as a keyboard including alphanumeric and other keys, may be coupled to the bus 601 for communicating information and command selections to the processor 603. The input device 613 can include a cursor control, such as a mouse, a trackball, or cursor direction keys, for communicating direction information and command selections to the processor 603 and for controlling cursor movement on the display 611.

According to various embodiments of the invention, the processes described herein can be provided by the computing system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 600 also includes at least one communication interface 615 coupled to bus 601. The communication interface 615 provides a two-way data communication coupling to a network link (not shown). The communication interface 615 sends and receives electrical, electromagnetic, or optical signals that carry digital data streams representing various types of information. Further, the communication interface 615 can include peripheral interface devices, such as a Universal Serial Bus (USB) interface, a PCMCIA (Personal Computer Memory Card International Association) interface, etc.

The processor 603 may execute the transmitted code while being received and/or store the code in the storage device 609, or other non-volatile storage for later execution. In this manner, the computing system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem or via a wireless link. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
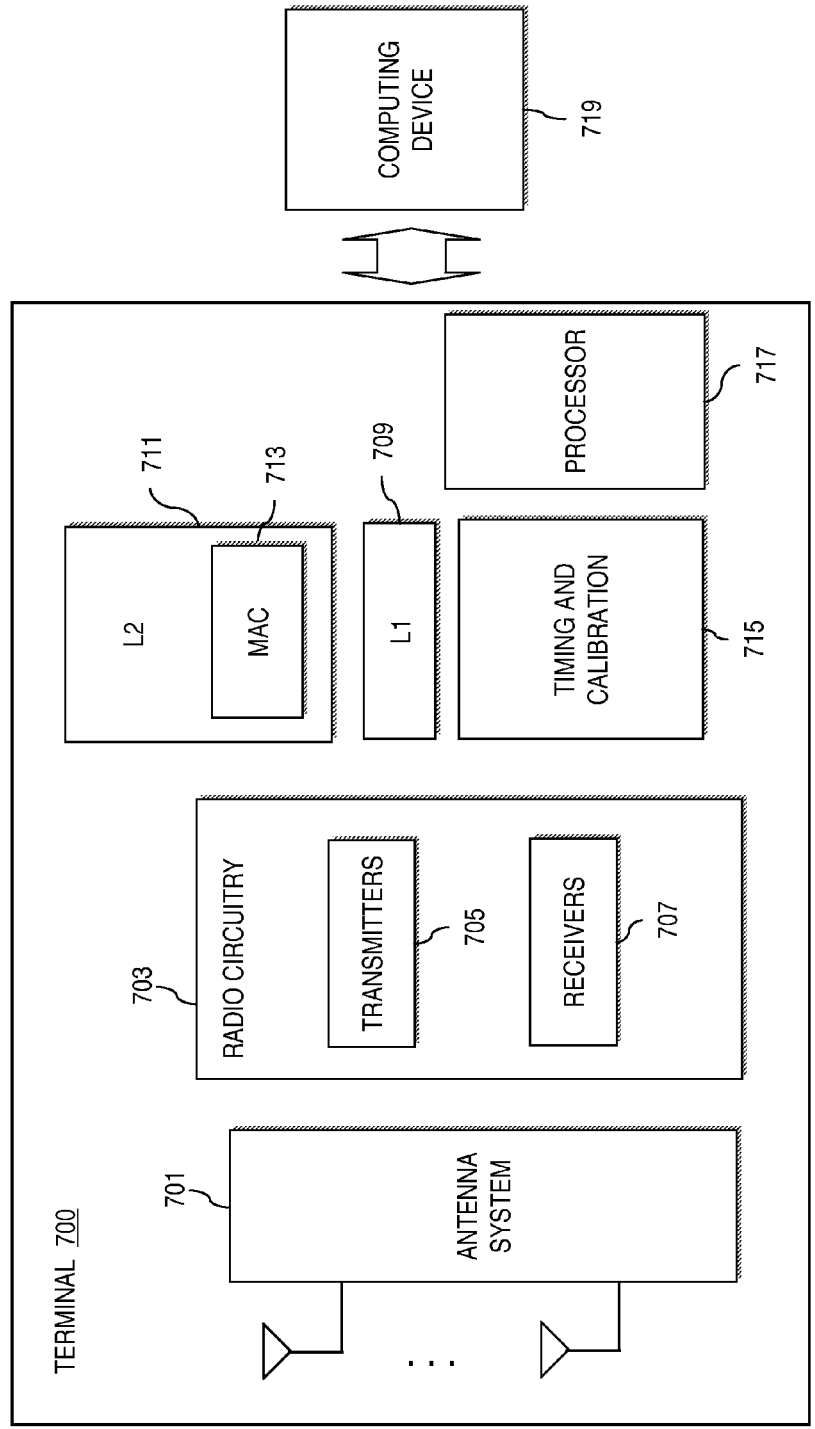
FIG. 7 is a diagram of exemplary components of an LTE terminal configured to operate in the systems of FIGS. 5A-5D, according to an embodiment of the invention.

FIG. 7 is a diagram of exemplary components of a user terminal configured to operate in the systems of FIGS. 5A-5D, according to an embodiment of the invention. A user terminal 700 includes an antenna system 701 (which can utilize multiple antennas) to receive and transmit signals. The antenna system 701 is coupled to radio circuitry 703, which includes multiple transmitters 705 and receivers 707. The radio circuitry encompasses all of the Radio Frequency (RF) circuitry as well as base-band processing circuitry. As shown, layer-1 (L1) and layer-2 (L2) processing are provided by units 709 and 711, respectively. Optionally, layer-3 functions can be provided (not shown). Module 713 executes all Medium Access Control (MAC) layer functions. A timing and calibration module 715 maintains proper timing by interfacing, for example, an external timing reference (not shown). Additionally, a processor 717 is included. Under this scenario, the user terminal 700 communicates with a computing device 719, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A machine-executable method comprising:
   determining an initiation point and a duration of a measurement gap that permits a user equipment to perform measurements;
   allocating an uplink resource of a communication link to the user equipment prior to the initiation point of the measurement gap by scheduling an uplink transmission; and
   determining, at least in part based on whether the uplink resource is allocated within a predetermined period prior to the initiation point of the measurement gap, reception of the uplink transmission to commence beyond the time period of the measurement gap.

2. The machine-executable method according to claim 1, wherein the resource allocation is signalled implicitly on a physical hybrid automatic repeat request indication channel, explicitly on a physical downlink control channel, or by a network rule on an available channel.

3. The machine-executable method according to claim 1, further comprising:
   receiving an uplink data transmission sent prior to the initiation point of the measurement gap; and
   delaying the signalling of an acknowledgement message of the data transmission under a hybrid automatic repeat request scheme to a point beyond the time period of the measurement gap.

4. The machine-executable method according to claim 3, further comprising:
   signalling the acknowledgement message relating to the hybrid automatic repeat request scheme on a physical hybrid automatic repeat request indication channel; and
   maintaining the resources associated with the signalling of the acknowledgement message.

5. The machine-executable method according to claim 3, further comprising:
   signalling the acknowledgement message relating to the hybrid automatic repeat request scheme on a physical downlink control channel.

6. A computer program product comprising a non-transitory computer-readable medium bearing computer program code embodied therein for use with a computer, the computer program code comprising:
   code for determining an initiation point and a duration of a measurement gap that permits a user equipment to perform measurements;
   code for allocating an uplink resource of a communication link to the user equipment prior to the initiation point of the measurement gap by scheduling an uplink transmission; and
   code for determining, at least in part based on whether the uplink resource is allocated within a predetermined period prior to the initiation point of the measurement gap, reception of the uplink transmission to commence beyond the time period of the measurement gap.

7. An apparatus comprising:
   at least one memory comprising instructions; and
   at least one processor,
   the at least one memory and the instructions configured to, with the at least one processor, cause the apparatus to perform at least the following:
   determine an initiation point and a duration of a measurement gap that permits a user equipment to perform measurements and allocate an uplink resource of a communication link to the user equipment prior to the initiation point of the measurement gap by scheduling an uplink transmission and determine, at least in part based on whether the uplink resource is allocated within a predetermined period prior to the initiation point of the measurement gap, reception of the uplink transmission to commence beyond the time period of the measurement gap.

8. An apparatus according to claim 7, wherein the apparatus is included in a base station that is compliant with a long term evolution (LTE) or evolved universal terrestrial radio access network (E-UTRAN) architecture.

9. An apparatus according to claim 7, wherein the at least one processor is further configured to signal the resource allocation either implicitly on a physical hybrid automatic repeat request indication channel, or explicitly on a physical downlink control channel, or by a network rule on an available channel.

10. An apparatus according to claim 7, wherein the at least one processor is further configured to receive an uplink data transmission sent prior to the initiation point of the measurement gap, and delay the signalling of an acknowledgement message of the data transmission under an error control scheme to a point beyond the time period of the measurement gap.

11. An apparatus according to claim 10, wherein the error control scheme is a hybrid automatic repeat request scheme.

12. An apparatus according to claim 10, wherein the at least one processor is further configured to signal the acknowledgement message relating to the error control scheme on a physical hybrid automatic repeat request indication channel and to maintain the resources associated with the physical hybrid automatic repeat request indication channel signalling.

13. An apparatus according to claim 10, wherein the at least one processor is further configured to signal the acknowledgement message relating to the error control scheme on a physical downlink control channel.

14. A method comprising:
   receiving an uplink resource allocation from a base station prior to a measurement gap, the uplink resource allocation comprising a scheduled uplink transmission;

detecting whether the uplink resource allocation occurs within a predetermined period prior to the measurement gap; and in response to the uplink resource allocation being detected to occur within the predetermined period, determining the resource allocation to be an allocation beyond the measurement gap, such that the scheduled uplink transmission commences beyond the measurement gap, and otherwise determining the resource allocation to be an allocation prior to the measurement gap, such that the scheduled uplink transmission commences prior to the measurement gap.

15. A computer program product comprising a non-transitory computer-readable medium bearing computer program code embodied therein for use with a computer, the computer program code comprising:

code for receiving an uplink resource allocation from a base station prior to a measurement gap, the uplink resource allocation comprising a scheduled uplink transmission;

code for detecting whether the uplink resource allocation occurs within a predetermined period prior to the measurement gap; and code for determining, in response to the uplink resource allocation being detected to occur within the predetermined period, the resource allocation to be a future allocation beyond the measurement gap, such that the scheduled uplink transmission commences beyond the measurement gap and otherwise determining the resource allocation to be an allocation prior to the measurement gap, such that the scheduled uplink transmission commences prior to the measurement gap.

16. An apparatus comprising:

at least one memory comprising instructions; and at least one processor, the at least one memory and the instructions configured to, with the at least one processor, cause the apparatus to perform at least the following:

receive an uplink resource allocation from a base station prior to a measurement gap, the uplink resource allocation comprising a scheduled uplink transmission;

detect whether the uplink resource allocation occurs within a predetermined period prior to the measurement gap; and in response to the uplink resource allocation being detected to occur within the predetermined period, determine the resource allocation to be an allocation beyond the measurement gap, such that the scheduled uplink transmission commences beyond the measurement gap, and otherwise determine the resource allocation to be an allocation prior to the measurement gap, such that the scheduled uplink transmission commences prior to the measurement gap.

17. The apparatus according to claim 16, wherein the at least one processor is further configured to receive the resource allocation either implicitly on a hybrid automatic repeat request indication channel, or explicitly on a physical downlink control channel, or by a network rule on an available channel.

18. The apparatus according to claim 16, further comprising:

a transmitter configured to transmit an uplink data transmission sent prior to the measurement gap; and a receiver configured to receive a delayed signalling of an acknowledgement message of the data transmission under a hybrid automatic repeat request scheme at a point beyond the time period of the measurement gap.

19. The apparatus according to claim 18, wherein the receiver is further configured to receive the acknowledgement message relating to the hybrid automatic repeat request scheme on a physical hybrid automatic repeat request indication channel or on a physical downlink control channel.

20. The apparatus according to claim 16, wherein the apparatus is a handset or a user terminal.

\* \* \* \* \*